United States Patent Office 2,946,217
Patented July 26, 1960

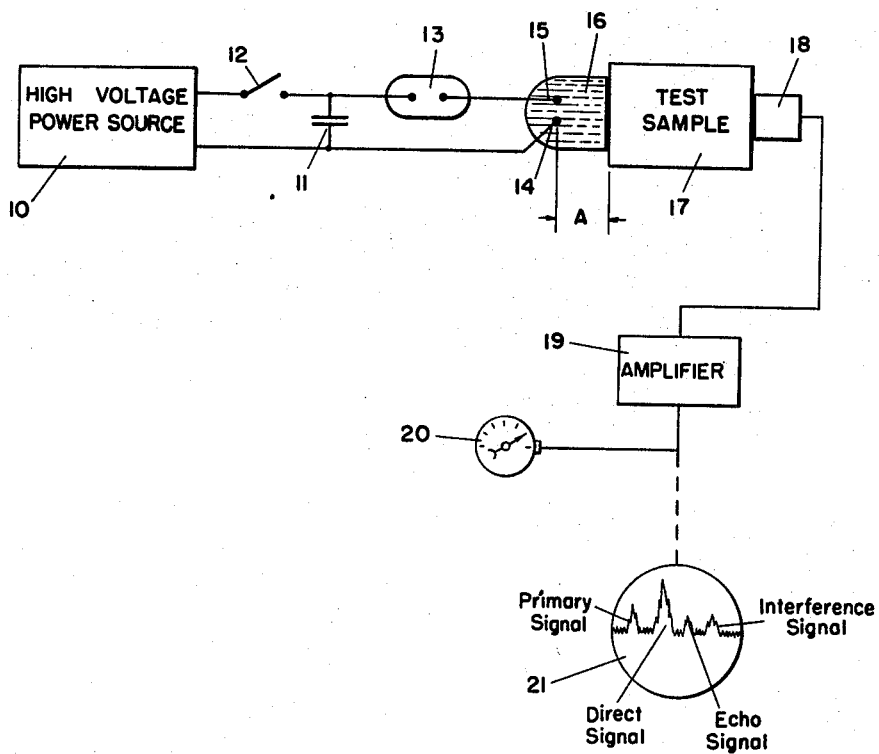

2,946,217

SYSTEM FOR PROBING MATERIALS BY SHOCK WAVE SIGNALS

Frank Fruengel, Wittenbergener Weg 79, Hamburg-Rissen, Germany

Filed May 13, 1955, Ser. No. 508,245

5 Claims. (Cl. 73—67.5)

The invention relates to the art of probing, inspecting and testing of materials by sonic and ultrasonic waves, and its primary object is to provide means for utilizing in this particular field shock waves produced by electric spark discharges through liquid.

In known systems for probing materials by ultrasonic signals it is customary to operate with wave trains of high frequency vibration and oscillatory circuits or high frequency generators to excite piezo-electric crystals or magneto-strictive transducer from which mechanical high frequency waves are radiated into the material under test, and to observe the attenuation of the reflected signals and their characteristic velocity to draw therefrom conclusions about the internal structure of the material or in other words, to detect hidden defects.

The present invention provides a new source of energy for probing, inspecting and testing of materials, which, in contrast to conventional sources, produces no vibration, but, for each signal, only one single impact in the form of a compression wave. Impacts of this sort produce substantially only pressure and no tension in the material under test and thus represent an unsymmetrical phenomenon, whereas sonic and ultrasonic frequencies of the conventional character produce vibrations which are symmetrical in that compression and tension alternate.

The shock wave source of this invention is inexpensive and of rugged construction and compression waves emanating therefrom act differently on the material under test and render in some cases more reliable information than ultrasonic vibrations.

The shock wave source, as provided by this invention, is an electric spark produced within a liquid which at the instant of its occurrence gives rise to a steep-fronted elastic compression wave in the liquid. Such compression wave is caused to beam into the material to be tested and can be received electrically at the opposite side of the sample under test by means of a quartz crystal or other piezoelectric receivers in a manner well known in the art.

The system as provided by this invention will be better understood by reading the following description of an embodiment depicted in the accompanying drawing wherein the only figure shows diagrammatically an arrangement found suitable for practicing the invention.

In the drawing there is indicated at 10 a high-voltage power source charging a storage condenser 11 whenever switching means 12 is closed. A discharge circuit of condenser 11 includes an auxiliary spark gap 13 and a spark gap formed by electrodes 14, 15 submersed in liquid, for instance, water, enclosed in a chamber 16, the combination of these elements forming an emitter for elastic shock waves and a new source of energy for material probing as provided by this invention. The auxiliary spark gap 13 in air or a suitable gas serves for effecting at its breakdown due to high condenser potential, the extremely short-timed discharges and in turn the steep-fronted compression waves which, when depending on the liquid-spark gap alone, would be considerably less pronounced, particularly, when the liquid is of the kind having a certain conductivity, for instance, water. Or, in other words, without the auxiliary spark gap in series with the spark gap within liquid, current of the condenser charge would start flowing off as soon as switch 12 is closed, because the liquid surrounding gap 14, 15 has a certain conductivity and therefore this gap has a considerably lower resistance than the auxiliary gap in gas or air. It cannot have a pronounced accurate break-down point at a certain potential. Flow-off of current as pointed out above, which starts as electrolytic flow through the liquid and gradually increases until finally a spark-over occurs, is undesirable since it represents a loss of energy and renders the instant of occurrence and the intensity of the spark discharge unreliable. Only with an auxiliary spark gap, that can be set for an exactly predetermined breakdown potential, can closing of the discharge circuit be achieved at the proper instant when the condenser charge reaches this breakdown potential. Such instantaneous closing of the discharge circuit with an exact quantity of discharge energy available is of importance to cause in liquid chamber 16 an immediate and rapid sparkover that is capable of giving rise to a steep compression wave. Chamber 16 has a flat surface or a surface of another configuration suitable to be brought in close contact with the surface of a sample for testing indicated at 17. Such test samples can be of metal or other construction materials, such as concrete blocks or the like, whose internal structural conditions are of interest. At the opposite side of sample 17 there is arranged an acoustic-electric converter 18 which preferably includes a piezoelectric crystal or the like. The converter changes the shock wave energy, after having penetrated the sample, into weak electric signals which can be amplified by amplifier 19 and then fed to an indicating instrument 20 depicting the intensity of the attenuated impulse; or can be introduced into a cathode ray tube indicated as a screen of such a tube at 21. The single-line connections shown between converter 18 and the instruments, etc. 19, 20, 21, respectively, are only a diagrammatic illustration of conventional connections. The oscilloscope may be connected by a line with the discharge side of the condenser 11 for receiving a primary signal at the instant of its discharge. However, this connection is usually not needed since the discharge of condenser 11 or the practically simultaneous spark-over at 13 transmits an impulse into the usually not entirely shielded amplifier 19 or oscilloscope 21 through the air, sufficient to produce a primary signal as indicated on the screen 21. From the amplitude of various signals and the shape of the pulse, indicated on the screen, valuable informations as to the structure of the sample can be had. The illustration, by way of example, of signals obtained from the application of a shock wave to the test sample 17 upon a spark-over between the electrodes 14, 15 corresponds to those obtained in conventional echo systems used for testing materials. The "primary signal" would correspond to the spark-over in the discharge gap 13, the "direct signal" would correspond to the shock-wave passing through the test sample 17 and impinging upon the converter 18, the "echo signal" would indicate the existence of a discontinuity or defect in the test sample 17 causing such "echo signal," while the "interference signal" would be caused by the interference of any of said signals with one another. An "echo signal" appears when energy transmitted through or past a defect of the test piece is reflected, at least partly, from its surface opposite the transmitter 16, and is then reflected back by the flaw to the receiver 18. In general, the means for receiving and evaluating the compression or shock wave signals emitted by the liquid-spark source of this invention are substantially similar to those employed by supersonic vibration systems, and since they constitute no part of this invention, they will not be described in detail here.

In operation, when switch 12 is closed, the condenser is charged to a potential above the breakdown voltage of auxiliary spark gap 13 causing breakdown of the spark gap and as consequence thereof also an abrupt and instant current impulse through spark gap 14, 15 in liquid. The resulting spark discharge through liquid gives rise to a shock-wave impulse which beams an elastic compression wave through the liquid and through the face of chamber 16, being in close contact with the surface of test sample 17, into and through this sample. Depending on the internal structure of the sample, the impulse will be attenuated and recordings on the cathode ray screen will indicate corresponding, comparable amplitudes, for instance, such as direct signal, an echo signal, a primary signal, an interference signal and so forth. The time of travel of the shock wave can be determined by the spacing between the signals on the screen as usual.

In experimental operation it has been discovered that in a region close to the spark-over through liquid the shock wave velocity is higher than sound velocity and may reach 10,000 meters per second, but that after a few centimeters of travel this speed decelerates to normal sound velocity. Therefore, in a system according to this invention, it is advisable to provide a spacing, which for practical purposes is of the order of 5 centimeters, between the spark gap in liquid and test sample so that the shock wave dampens to normal sound velocity before entering the material under test. Such spacing is indicated at A in the drawing and can be obtained by a suitable length of chamber 16.

The system as provided by this invention, operating with compression shock waves produced by electric spark discharges through liquid, resembles more closely natural phenomena, such as a striking blow, and renders more accurate results than ultrasonic vibrations of high frequency as generally employed in the pertinent art.

It will be understood that the system shown and described is only one preferred embodiment of the invention and that modifications in arrangement and design of the essential elements can be made without departing from the spirit and scope of the invention.

What is claimed is:

1. In a system for probing material by mechanical shock wave signals originating from electric sparks in liquid, an enclosure filled with liquid and having a wall portion suitable for being placed in intimate contact with a sample of material to be tested, a storage condenser, a high voltage power source, connecting means between said power source and said condenser including switching means to effect charging of said condenser from said source, a discharge circuit for said condenser including spark gap means within said liquid and an auxiliary gaseous spark gap in series arrangement, said auxiliary spark gap being designed for a breakdown voltage lower than the operating voltage of said power source to effect a breakdown surge of extremely short duration through said spark gap means within the liquid in the form of a spark-over through liquid at the instant the condenser voltage reaches the breakdown voltage of said auxiliary spark gap, said spark-over through liquid causing an abrupt pressure shock wave to be radiated through said liquid and said enclosure wall portion into said material sample under test, whereby to draw from the behavior of said shock wave in said sample conclusions about the internal structure thereof.

2. In a system for probing materials by shock wave signals, a chamber filled with liquid and having a face wall portion adapted to be placed in intimate contact with a sample of material to be probed, a high voltage power source, electric energy storage means connected to be charged from said source, spark discharge means within said liquid, connecting means between said storage means and said discharge means to form a normally open discharge circuit, circuit closing means interposed in said connecting means and becoming operative at a predetermined potential that is lower than the operating voltage of said power source to effect by closing of said circuit an electric discharge through said spark discharge means in the form of a spark-over through said liquid, whereby each spark-over through liquid causes an abrupt mechanical compression wave to be radiated through said liquid and said face wall portion into the material to be probed thereby.

3. The structure as claimed in claim 2, wherein said circuit closing means is a gaseous spark gap means.

4. In a system for probing samples of material by mechanical compression wave energy, a chamber filled with liquid medium and having a wall portion adapted to be brought in close contact with the sample to be probed, a pair of electrodes submerged in said liquid medium within said chamber and spaced to form a spark gap therein, a high voltage power source, an electric energy storage means connected to be charged from said source, connecting means between said storage means and each one of said electrodes to form a discharge circuit for said storage means, and means becoming effective for discharging said storage means through said discharge circuit upon attainment of a predetermined potential that is lower than the operating voltage of said power source, said discharge through said liquid across said electrodes in the form of a spark-over causing an abrupt mechanical compression wave to be radiated through said liquid medium and said chamber wall portion into said sample to be probed, whereby to draw from the behavior of said compression wave in said sample conclusions about the internal structure thereof.

5. In a system for probing materials by mechanical compression waves, a chamber filled with liquid and having a wall portion adapted to be brought in close contact with the material to be probed, a high voltage power source, electric energy storage means connected to be charged from said source, spark gap means located within said liquid at a distance from said wall portion, connecting means between said storage means and said spark gap means to form a normally open discharge circuit for said storage means, circuit closing means interposed in said connecting means and becoming operative at a predetermined potential that is lower than the operating voltage of said power source to effect by closing of said circuit an electric discharge across said spark gap means in the form of a spark-over through said liquid, whereby each such spark-over causes an abrupt pressure shock wave to be radiated therefrom at an initial velocity higher than sound velocity and decelerating after a certain distance of travel to normal sound velocity, said distance between said wall portion in contact with said material and said spark gap means being at least equal to the distance travelled by said shock wave at a velocity higher than sound velocity, whereby the shock wave on entering the material to be probed travels therethrough at sound velocity to render indications from which conclusions about the internal structure of the material can be drawn.

References Cited in the file of this patent
UNITED STATES PATENTS

| | | |
|---|---|---|
| 1,969,037 | Rieber | Aug. 7, 1934 |
| 2,280,226 | Firestone | Apr. 27, 1942 |
| 2,532,507 | Meunier | Dec. 5, 1950 |
| 2,544,477 | West | Mar. 6, 1951 |
| 2,617,080 | Nims | Nov. 4, 1952 |